United States Patent Office 3,267,667
Patented August 23, 1966

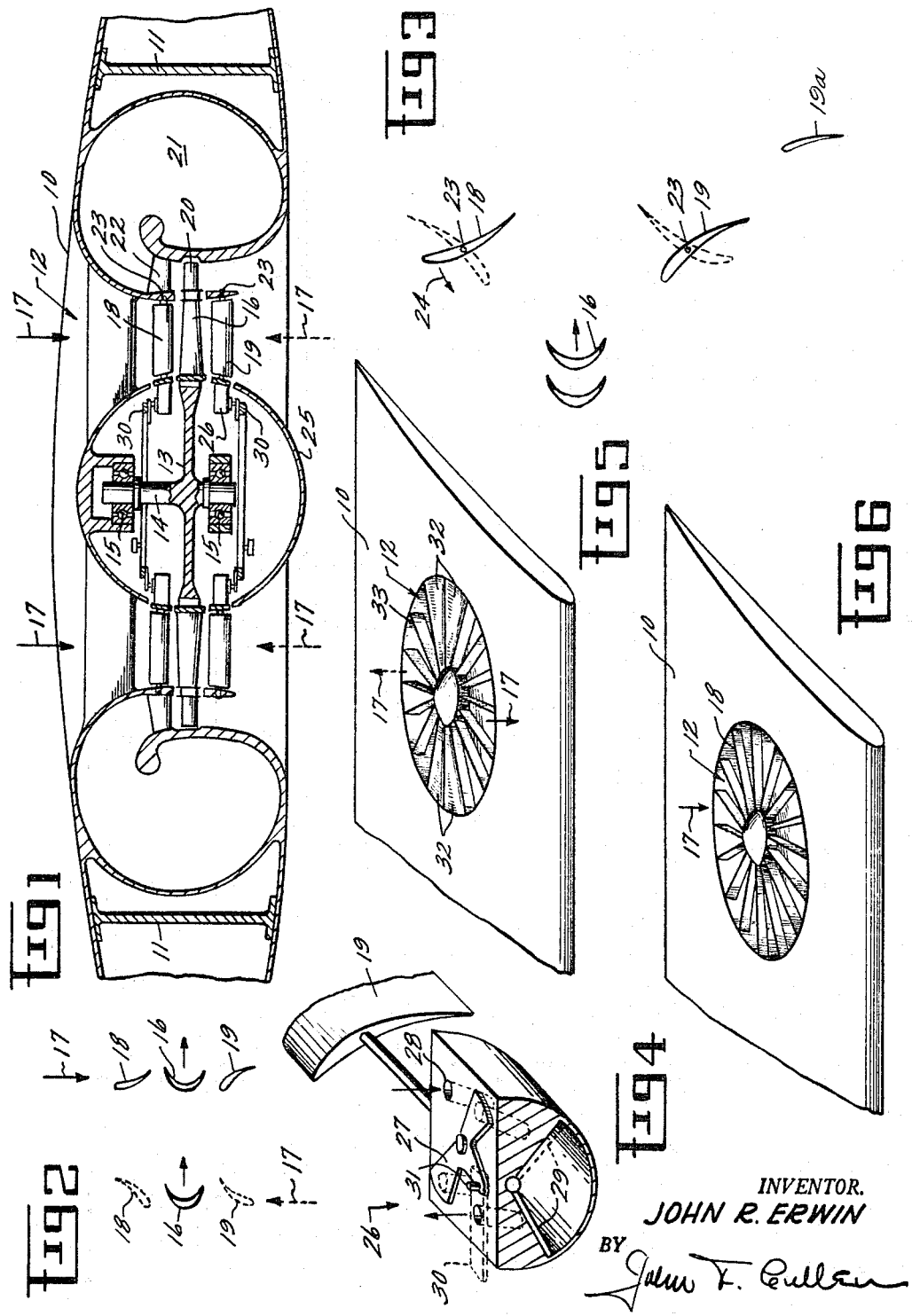

3,267,667
REVERSIBLE FLOW FAN
John R. Erwin, Cincinnati, Ohio, assignor to General
Electric Company, a corporation of New York
Filed June 25, 1964, Ser. No. 378,014
9 Claims. (Cl. 60—35.54)

This invention relates to a reversible flow fan and, more particularly, an impulse axial flow bladed fan that operates equally in both directions and may conveniently be used for roll control in aircraft.

In aircraft, such as VTOL aircraft, a means must be provided for roll control especially during the hovering stage of the mission. Numerous schemes have been proposed and a common arrangement is the use of control jets at some distance from the fuselage centerline to create moments about the centerline to control the rolling of the aircraft. Generally these reaction jets or their equivalents are directed downward so that the wing is forced upward by the jets. Thus, by operating the control jet on one side while cutting it off on the opposite side of the fuselage centerline, a roll moment is imposed on the aircraft. A further type of roll control has been the use of small fans located near the wing tip and these have operated in the downward direction to provide an upward force on the wing and thus a moment on the aircraft. In both cases the fluid reaction is in one direction only requiring a given size of device to develop the force required for the roll moment. It will be apparent that operation of the reaction fluid in either the upward or downward direction would have great advantages. This would result in reduction of the size, the weight, and the actuation forces necessary by making them cumulative, i.e., one wing could be pushed up by the reaction while the opposite wing is pushed down. This is in contrast to the conventional roll control with the force downward from zero up to a maximum. By providing a reversible arrangement it is possible to produce forces of equal magnitude either up or down so that the force that is required to produce a given rolling moment is substantially cut in half and the size of the device, hardware required, and weight are reduced accordingly. The present invention is directed to such a reversible flow fan.

The main object of the present invention is to provide a reversible flow fan that is able to develop forces in either direction and direct the flow through the fan accordingly.

Another object is to provide a fan which produces the same roll moment on an aircraft with a considerably smaller fan that is lighter in weight and requires less power than conventional fans.

A further object is to provide such a reversible flow fan in which the reaction time is very fast, and a fan that makes it possible to use continuous power from the power or prime source of energy so that no power control is required to operate the fan in either direction.

Briefly stated, the invention is directed to a reversible flow fan which utilizes a supporting structure with a duct therein. Such structure may be an aircraft wing in which the invention will be described for illustration. A disc is supported on an axis for rotation transversely of the duct and the disc has radially extending impulse compressor blades on its periphery to move air through the duct. Suitable means, such as a tip turbine, are provided to rotate the disc which induces air flow. The disc is provided with movable guide vanes upstream and downstream of the impulse blades and means are provided to rotate the guide vanes so that they reverse position from inlet guide vanes to outlet guide vanes and vice versa. This reversal results in reversal of flow through the duct. Additionally, the device is made to operate by rotation of the guide vanes simultaneously or in groups independently and sequentially.

While the specification concludes with claims particularly pointing out and distinctly claiming the subject matter which is regarded as the invention, it is believed the invention will be better understood from the following description taken in connection with the accompanying drawings in which:

FIG. 1 is a cross-sectional view of the reversible flow fan as it might be applied to the wing of an aircraft;

FIG. 2 is an end view of the vanes aligned with FIG. 1 and illustrating positions for different directions of air flow;

FIG. 3 is an enlarged composite diagram of the airfoil vanes used in the instant invention illustrating different positions thereof and direction of turn;

FIG. 4 is a partial perspective of a typical vane turning mechanism;

FIG. 5 is a partial view of an aircraft wing to illustrate diagrammatically non-symmetrical control; and FIG. 6 is a view similar to FIG. 5 illustrating symmetrical control.

The present invention will be described as applied to the wing of an aircraft as it is primarily intended for such application. It should be noted that it could equally be used for pitch control. However, its use is not limited to such aircraft applications since it will be apparent that many other uses for a reversible flow fan may be required. However, for convenience, the description is directed to the aircraft wing application.

In VTOL aircraft it is desired to provide roll control on the aircraft during hovering at which time there is no control reaction available from the flaps or ailerons in the normal sense. Such controls may be conveniently supplied by fans in the wing tips of the aircraft as, for example, in a lift fan type aircraft as illustrated in U.S. Patent 2,940,689. The use of such fans are confined to providing only downward flow to impose a moment on the aircraft. It will be apparent that the use of the fans to provide both an upward or downward movement would result in great advantages. First, the fans would need to be only half as large resulting in lighter weight fans, smaller ducting, and faster reaction time due to the smallness of the fans. Additionally, if some flow through the fans is permitted at all times, it is possible to use continuous power from the prime source of energy so that power control to the fan is not required.

Referring to FIG. 1, there is shown a reversible flow fan that provides all the advantages pointed out above. To this end, a wing 10 is provided with conventional spanwise spars 11 between which the fan of the invention may be mounted. In order to provide a passage for air from one side of the wing to the other, there is provided a substantially vertical duct generally indicated at 12 in the wing supporting structure and passing completely through the wing. For movement of air through the duct a disc 13 is disposed transversely therein. The disc is supported on a shaft 14 that is in turn supported in bearings 15. Thus, the disc 13 rotates transversely in the duct. Air movement through the duct is provided by radially extending impulse compressor blades 16 that extend like the spokes of a wheel from the disc 13 and pump air through the duct 12 depending on the position of guide vanes as will be described. For the reversible flow fan feature it is essential that compressor blades 16 be of the impulse axial flow type. Such a blade is one in which the static pressure on the upstream and downstream sides of the blade and the air inlet angles and exit angles are the same. In other words, in cross-section the blade is symmetrical with sharp leading and trailing edges as shown at 16 in FIG. 2. In order to direct the air flow properly through the compressor blades suitable guide vanes are provided upstream and downstream of blades 16.

For purposes of description it will be assumed that it is desired to have air flow from the top of the wing downwardly through the duct as shown by solid arrow 17. In this mode of operation and referring to the vanes below solid arrow 17 in FIG. 2, movable inlet guide vanes 18 are provided upstream of compressor blades 16 and similarly movable outlet guide vanes 19 are provided downstream. Both of these guide vanes are preferably cambered airfoil shaped vanes which are supported in the duct adjacent the compressor blades. For the movement of air as described from the upper to the lower surface, FIG. 2 shows the cross-sectional positions of vanes 18 and 19 and blades 16 in the environment of FIG. 1. The same structure in an enlarged composite arrangement is shown in FIG. 3. The solid positions of vanes 18 and 19 in each figure represent air flowing from the top to the bottom through the duct in the direction of solid arrow 17.

In order to rotate the disc and the compressor blades thereon any suitable means may be used such as well known shaft driving means not shown. A convenient and preferred means is a tip turbine fan which employs tip turbine buckets 20 that operate in a complete or partial admission scroll 21 extending around at least part of the disc periphery and carrying hot exhaust gas or compressor air from a prime energy source not shown to drive the fan. Suitable nozzle structure 22 to direct the driving fluid onto the buckets 20 may be used. Thus, it will be seen that the position of vanes 18 and 19 in conjunction with blades 16 provides for movement of air downwardly as shown by solid arrows 17 through the fan to provide an upward reaction on wing 10.

In order to provide for movement of air through the fan in an opposite or upward direction as shown by dotted arrow 17 in FIGS. 1 and 2, it is necessary that vanes 18 and 19 reverse their function of operation, i.e., vanes 19 must become inlet guide vanes and vanes 18 must become outlet guide vanes. To this end, both vanes 18 and 19 are rotatable preferably about an axis 23 within their cross-section so that they flip over to the dotted position as shown in FIGS. 2 and 3. In this position, air flow occurs from the bottom of wing 10 upwardly in the direction of dotted arrow 17 and out the top of wing 10. It will be apparent that vanes 18 and 19 may assume their new dotted position by rotation in either of two directions. However, to assume the dotted position with least rotation, FIG 3 shows that rotation of the leading edge of vane 18 towards its convex surface or counterlockwise in the direction of arrow 24, places the vane 18 in the dotted position after a travel of about 115° as shown. The vane could be rotated clockwise over a complementary angle or larger arc and assume the same position. Similarly, least travel from the dotted to the solid position is the reverse as will be obvious. Suitable operation and proper direction of the inlet and outlet vectors is obtained in conjunction with the compressor blades 16 by such movement of the guide vanes 18 and 19 between 80° and 120°. Fixed auxiliary swirl removing vanes 19a may be used if required.

Rotation of the vanes 18 and 19 may be by any suitable mechanism that can be conveniently housed within a hub section 25 centrally of the fan. While it is not the purpose of this invention to describe specific mechanism, a diagrammatic showing of a typical arrangement is shown in FIG. 4. The means for rotating the guide vanes, generally indicated at 26 in FIG. 1 may comprise a valve cover 27 which controls pneumatic ports such as 28 to operate plate 29 in an air chamber and flip vane 19 from one position to the other as shown in FIG. 4. Valve cover 27 may be operated centrally of the hub by a link arm 30 that is connected to operate the vanes independently and sequentially by offsetting pins 31 in groups or operate all the vanes together by connecting to pins 31 as will be pointed out hereinafter.

Referring next to FIG. 5, there is diagrammatically shown what is called the non-symmetrical control for operating the individual guide vanes. In this arrangement approximately half of the fan is permitted to have the flow moving in a vertically downward direction through it and the other half has the flow moving upward. This, as shown by the arrows as previously marked, is the front and rear portion of the fan respectively. The result is a neutral position or no control or reaction force since one flow balances the other. In such an arrangement the vanes are individually controlled as mentioned above. The advantage of such a system is that the rotor requires the same amount of power at all control positions including the neutral position and the fan does not tend to overspeed. In this method of control then the vanes are individually and sequentially controlled so that, as an example, a pair or more of vanes constituting a group may be flipped to add segments 32 to progressively reverse the airflow. This sequential and independent non-symmetrical control has an additional advantage. As the vanes in segments 32 adjacent to the upward flow at the rear of the fan as shown in FIG. 5 are flipped so that their flow through the fan reverses from down to up the upward air flow at the rear of the fan in portion 33 adjacent the flipped vanes induces the reversal. In other words, the air immediately and quickly changes direction.

The other control arrangement is the symmetrical control system as shown in FIG. 6 where the vanes are shown open as for flow down through the wing. In this system, all the vanes are simultaneously rotated from one position to the other. When less force is desired the inlet guide vanes 18 and the outlet guide vanes 19 below are moved toward the closed position and, for flow in the opposite direction, through the closed position and into the reversed dotted position. It will be apparent that the vanes then pass through a zero flow position. In the event that the fan is unable to operate satisfactorily in the no-flow position it is possible, by suitable mechanism not shown, to momentarily cut off the driving force. This is easily accomplished with the tip turbine arrangement by cutting off the fluid supply to the tip turbine buckets 20 by valves are equivalent to avoid overspeeding of the fan in the neutral position since the power absorbed by the fan is very low in the neutral position.

In either case the inlet guide vanes and the outlet guide vanes change position and function. This, in combination with the impulse compressor blades results very quickly in reverse flow through the fan. In other words, the air flow will decrease or reverse just as quickly as the vanes change positions. There is no large aerodynamic lag in the air flow and the air flow follows the requirements of the vanes in hundredths of a second. This is more readily seen in the non-symmetrical control of FIG. 5 because of the induction effect of the air in portion 33 when the vanes are moved to reverse the flow in the adjacent segment 32. Thus, as part of the vanes are closed down the downward flow stops through those vanes. Adjacent to those closed vanes there is rapidly moving upward flow so the air is induced by this adjacent flow as the vanes are opened as well as being impelled by the rotor blades themselves. In the symmetrical control of FIG. 6, all the air is stopped and restarted by the action of the rotor blades 16 and the vanes.

It will be apparent that the reversible flow fan, by the use of the impulse compressor blades and the guide vanes that change function, permits smaller fans and positive control in either direction when applied to an aircraft as described herein.

While there have been described preferred forms of the invention, obvious modifications and variations are possible in light of the above teachings. It is therefore to be understood that within the scope of the appended claims, the invention may be practiced otherwise than as specifically described.

I claim:
1. A reversible flow fan comprising,
a supporting structure having a duct therein,
a disc supported on an axis for rotation transversely in said duct,
said disc having radially extending impulse compressor blades on the periphery thereof, means to rotate said disc,
movable inlet guide vanes disposed upstream and movable outlet guide vanes disposed downstream of said blades,
and means to rotate said guide vanes to form inlet guide vanes of said outlet guide vanes and vice versa whereby air flow through said duct is reversed.
2. Apparatus as described in claim 1 wherein said means to rotate said disc comprises tip turbine buckets mounted on the periphery of said blades.
3. Apparatus as described in claim 1 wherein said means to rotate said guide vanes simultaneously rotates all said vanes.
4. Apparatus as described in claim 1 wherein said means to rotate said guide vanes is connected to groups of vanes to independently and sequentially rotate said vanes.
5. A reversible flow fan for attachment to an aircraft for vertical propulsion comprising,
an aircraft supporting structure having a substantially vertical duct therethrough,
a horizontal disc supported on an axis for rotation within said duct,
radially extending impulse compressor blades disposed about the disc periphery,
means to rotate said disc,
rotatable cambered airfoil inlet guide vanes supported in said duct adjacent to and upstream of said blades,
rotatable cambered airfoil outlet guide vanes supported in said duct adjacent to and downstream of said blades,
and means to rotate said guide vanes to form inlet guide vanes of said outlet guide vanes and vice versa whereby air flow through said duct is reversed.
6. Apparatus as described in claim 5 wherein said means to rotate said disc comprises radially extending tip turbine buckets mounted on the periphery of said blades.
7. Apparatus as described in claim 5 wherein said means to rotate said guide vanes simultaneously rotates all said vanes between 80° and 120°.
8. Apparatus as described in claim 5 wherein said means to rotate said guide vanes is connected to groups to independently and sequentially rotate said vanes between 80° and 120°.
9. Apparatus as described in claim 6 including scroll means extending at least partly about the periphery of said disc,
and nozzles in said scroll to direct a driving fluid on said turbine buckets.

References Cited by the Examiner

UNITED STATES PATENTS

| | | | |
|---|---|---|---|
| 2,777,649 | 1/1957 | Williams | 244—23 |
| 2,974,900 | 3/1961 | Morris et al. | 244—51 X |
| 3,061,243 | 10/1962 | Simon | 244—23 |
| 3,203,645 | 8/1965 | Shaw | 244—23 |

FOREIGN PATENTS 884,930  7/1953  Germany.

MARK NEWMAN, *Primary Examiner.*
C. R. CROYLE, *Assistant Examiner.*